Figure 1:
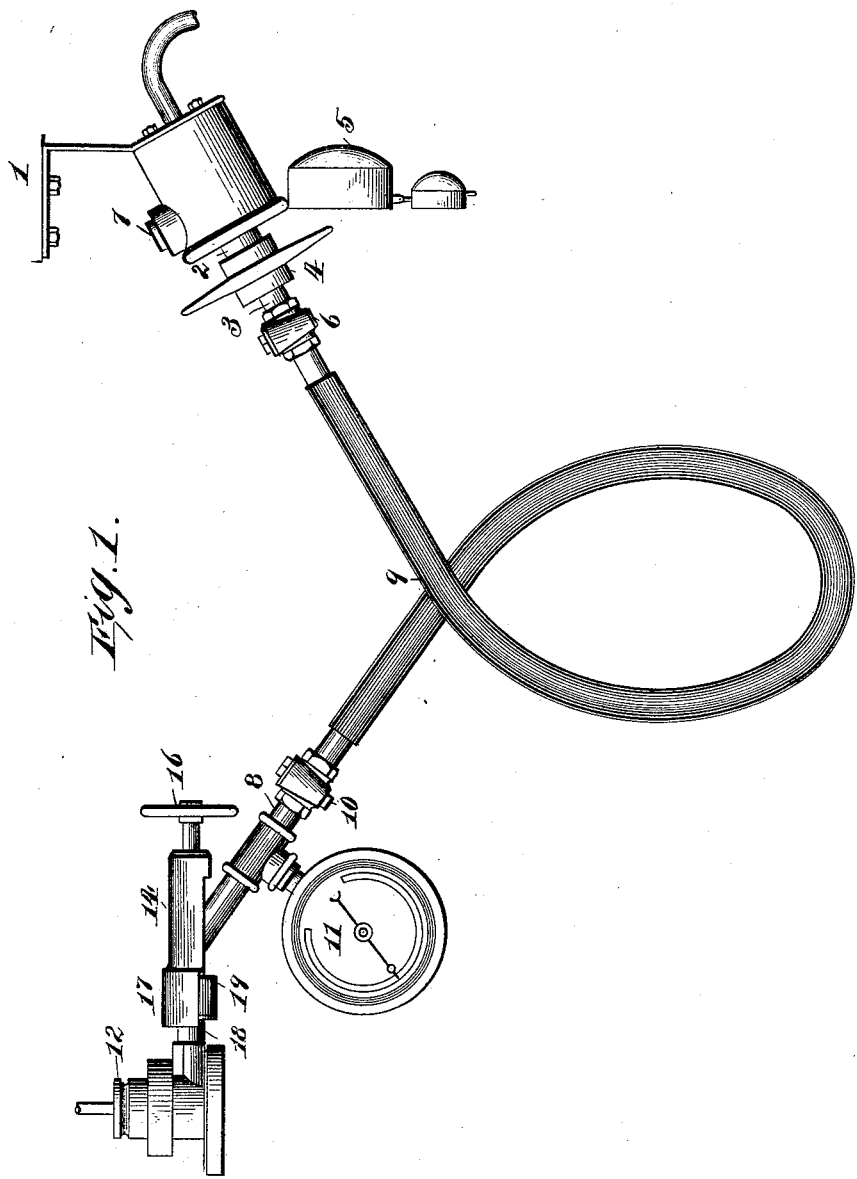

(No Model.) 2 Sheets—Sheet 1.

R. M. DIXON.
APPARATUS FOR CHARGING CAR GAS LIGHTING TANKS FROM GAS MAINS.

No. 483,106. Patented Sept. 20, 1892.

Witness
Louis G. Julihn
Eric G. Julihn

Inventor
R. M. Dixon.
By Hopkins & Atkins
Attorneys

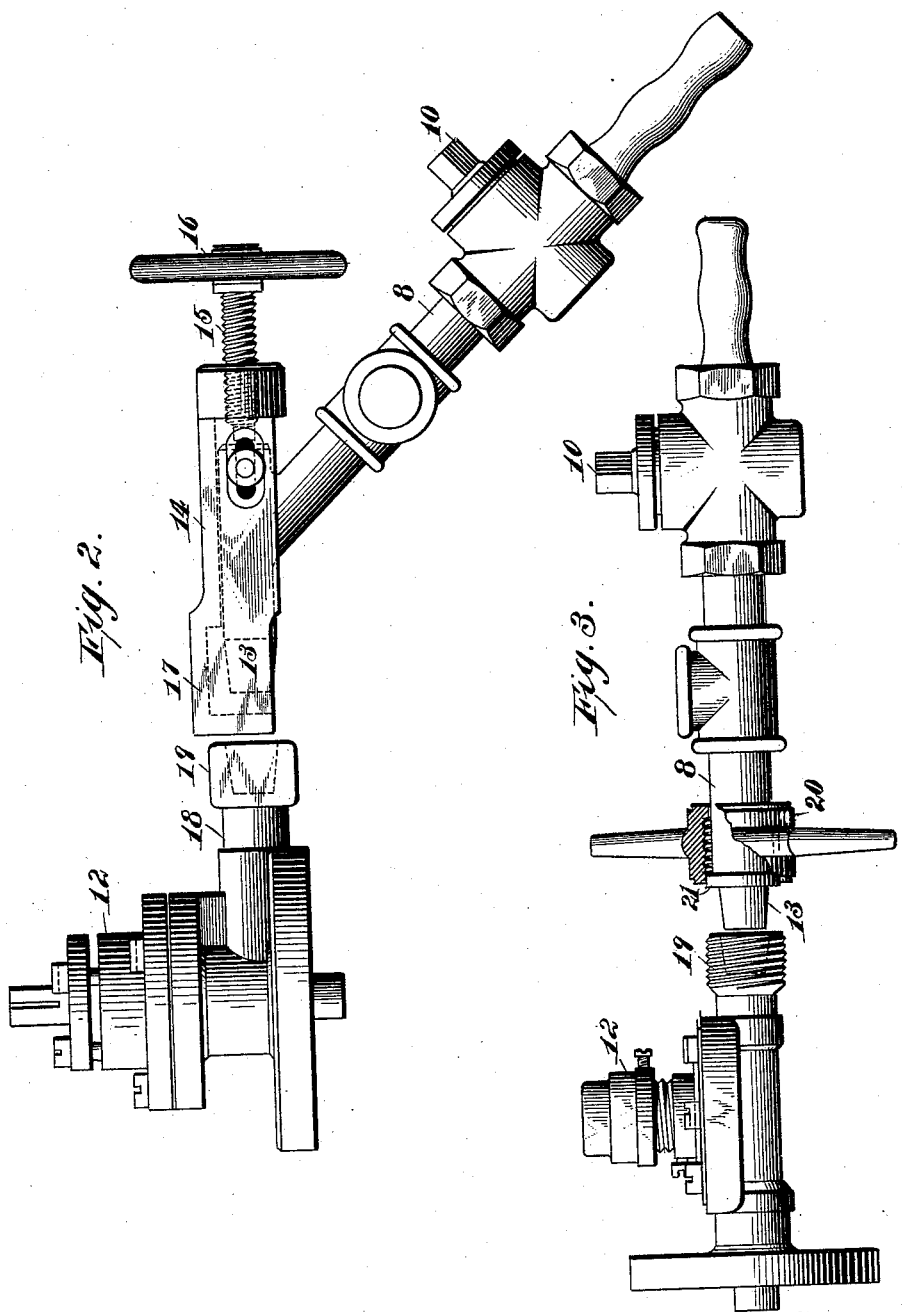

UNITED STATES PATENT OFFICE.

ROBERT M. DIXON, OF EAST ORANGE, NEW JERSEY, ASSIGNOR TO THE SAFETY CAR HEATING AND LIGHTING COMPANY, OF NEW YORK.

APPARATUS FOR CHARGING CAR GAS-LIGHTING TANKS FROM GAS-MAINS.

SPECIFICATION forming part of Letters Patent No. 483,106, dated September 20, 1892.

Application filed November 30, 1891. Serial No. 413,525. (No model.)

*To all whom it may concern:*

Be it known that I, ROBERT M. DIXON, of East Orange, county of Essex, and State of New Jersey, have invented certain new and useful Improvements in Apparatus for Charging Car Gas-Lighting Tanks from Gas-Mains, of which the following is a specification, reference being had to the accompanying drawings.

The object of my invention is to provide means of charging a gas-lighting tank of a car from a gas-main, by which the escape of gas, causing bad odors and danger of fire, is prevented, and by which the registration of a gage for measuring the pressure of gas-supply is rendered more exact and danger of fire in reading the same, where artificial light has to be used, is materially diminished.

Heretofore in charging the gas-lighting tank of a car from the distributing pipe-lines or mains through which the gas is conveyed to the yard where the cars are to be charged a hose has been simply fitted at each end, with ground-joint unions adapted to be fastened to the main and to the tank without cocks or gage in the hose. After connecting the hose with the filling-valve on the car and the pipe-line, respectively, the two valves have been opened and the gas under pressure allowed to flow into the tank from the main. After the tank became filled the valves have been closed and the hose disconnected. Thereupon the gas under pressure in the hose being allowed to escape caused both loss of gas and bad-smelling odors in the neighborhood of the car. My improvement in this connection is to supply cocks at each end of the hose and confine the gas within the hose, so as to prevent any considerable escape of gas. Heretofore, also, gages have not been used on the hose, but on the car, and subjected to the wear of railroad travel became frequently out of order and registered incorrectly. Besides, there has been danger of injuring the painting of the cars by igniting the escaping gas in reading the gage at night by the aid of the unprotected lights.

By my improvement I provide a gage upon the hose and am enabled thereby to attach it near the main remote from the car, where there is less danger of leakage of gas, because the operator can make his joint leisurely at that point and make the union more perfect. Besides, ignition of gas at such a point would not injure the paint of the car. The gage also may be frequently tested and the accuracy of its indications maintained, or a new gage may be supplied when needed, which would be impracticable in a car in constant use.

In the accompanying drawings, Figure 1 is a side elevation of my apparatus complete. Fig. 2 is a view in detail of the pipe-line connection, and Fig. 3 a view of a modified form of the same.

Referring to the figures on the drawing, 1 indicates a gas-tank of a car, and 2 a screw-threaded connection permanently attached thereto for filling the tank, to which a hose-fitting 3 may be fastened by means of the internally-screw-threaded joint 4.

5 indicates a cap, which may be employed for covering up the end of the connection 2 to protect it when not in use for filling the tank.

6 indicates a cock in the hose-fitting near its end, and 7 a valve in the connection 2 for confining the gas within the tank.

8 indicates a hose-fitting, and 9 a hose connecting it with the fitting 3. The fitting 8 is likewise provided with a cock 10 and also with a gage 11.

It is desirable to have ready means for connecting the fitting 8 with or disconnecting it from the valve 12, that is in use permanently connected with a gas-main, not necessary to illustrate in the drawings. For this purpose the head of the fitting is provided with a ground-joint 13, adapted to slide longitudinally in fixed ways within a clutch-piece 14 and to be operated by a screw 15 in the head thereof, to which is fastened a wheel 16 for turning it. The clutch-piece at its opposite end is provided with a hood 17, that is loosely fitted to the neck 18 and collar 19 of the valve 12. The inside of the collar 19 is ground out to make a tight joint with the part 13.

In use the wheel 16 is turned so as to allow the hood 17 to be readily fitted over the neck 18 behind the collar 19. Then by turning the wheel 16 a corresponding ground-joint is forced into the ground end of the collar 19 and the parts fastened tightly and securely together.

In Fig. 3 of the drawings is illustrated another suitable form of uniting the fitting-line to the main-line valve, in which the exterior of the collar 19 is screw-threaded, and the part 13, deprived of the clutch-piece, is provided with a flange 21 and an interior screw-threaded collar 20, adapted to fit also the collar 19, so that when the parts of the ground-joints are placed together and the collar 20 screwed upon the collar 19 the parts will be firmly fastened together.

What I claim is—

1. In an apparatus for charging car-lighting tanks, the combination, with a section of hose having fittings with cocks on opposite ends, of a pressure-indicator connected to one of said fittings between the cock thereof and the connecting end of said fitting, substantially as and for the purposes specified.

2. In an apparatus for charging car-lighting tanks, the combination of a section of hose having secured at each end fittings with cocks, whereby the escape of gas is prevented throughout the hose, and one of said fittings having a joint connection for a tank, the other fitting provided with a recessed collar having a joint sliding therein, and means for operating said joint, substantially as and for purposes specified.

In testimony of all which I have hereunto subscribed my name.

ROBT. M. DIXON.

Witnesses:
  S. VAN PRAAG,
  RANDOLPH PARMLY.